US006954689B2

(12) United States Patent
Hanson et al.

(10) Patent No.: US 6,954,689 B2
(45) Date of Patent: Oct. 11, 2005

(54) METHOD AND APPARATUS FOR MONITORING WORK VEHICLES

(75) Inventors: Richard E. Hanson, Lincoln, MA (US); Garry L. Ball, Cumming, GA (US); Steven E. Valla, Suwanee, GA (US)

(73) Assignee: CNH America LLC, New Holland, PA (US)

( * ) Notice: Subject to any disclaimer, the term of this patent is extended or adjusted under 35 U.S.C. 154(b) by 27 days.

(21) Appl. No.: 10/034,404

(22) Filed: Dec. 28, 2001

(65) Prior Publication Data

US 2002/0156558 A1 Oct. 24, 2002

Related U.S. Application Data

(60) Provisional application No. 60/276,820, filed on Mar. 16, 2001.

(51) Int. Cl.[7] .............................................. G06F 19/00

(52) U.S. Cl. ............................ 701/33; 701/29; 701/50; 340/438

(58) Field of Search ............................ 701/50, 29, 30, 701/33, 34, 35; 340/438, 439

(56) References Cited

U.S. PATENT DOCUMENTS

| | | | | |
|---|---|---|---|---|
| 4,072,850 A | | 2/1978 | McGlynn | |
| 4,258,421 A | | 3/1981 | Juhasz et al. | |
| 4,602,127 A | | 7/1986 | Neely et al. | |
| 4,804,937 A | | 2/1989 | Barbiaux et al. | |
| 4,926,331 A | * | 5/1990 | Windle et al. | 701/35 |
| 5,223,844 A | | 6/1993 | Mansell et al. | |
| 5,345,383 A | | 9/1994 | Vance | |
| 5,400,018 A | * | 3/1995 | Scholl et al. | 340/10.3 |
| 5,729,452 A | * | 3/1998 | Smith et al. | 701/29 |
| 6,192,303 B1 | | 2/2001 | Takakura et al. | |
| 6,212,483 B1 | * | 4/2001 | Carew et al. | 702/183 |
| 6,278,921 B1 | | 8/2001 | Harrison | |
| 6,295,492 B1 | * | 9/2001 | Lang et al. | 701/33 |
| 6,405,111 B2 | * | 6/2002 | Rogers et al. | 701/33 |
| 6,553,290 B1 | * | 4/2003 | Pillar | 701/33 |
| 6,560,516 B1 | * | 5/2003 | Baird et al. | 701/23 |
| 2002/0016655 A1 | * | 2/2002 | Joao | 701/35 |
| 2005/0021197 A1 | * | 1/2005 | Zimmermann et al. | 701/29 |
| 2005/0021199 A1 | * | 1/2005 | Zimmermann et al. | 701/29 |

* cited by examiner

*Primary Examiner*—Gary Chin
(74) *Attorney, Agent, or Firm*—John William Stader

(57) ABSTRACT

An operator interactive apparatus for monitoring work vehicles is disclosed. The operator interactive apparatus includes an operator and machine interface for generating inputs from a work vehicle operator. The generated inputs describe conditions or problems associated with the work vehicle. The information collected by a microprocessor is communicated directly to a remote data center over a wireless data link. The information is shared and a technical service group may dispatch parts and/or maintenance information directly to a fleet operation center or alternatively directly to the operator of the work vehicle.

24 Claims, 3 Drawing Sheets

METHOD AND APPARATUS FOR MONITORING WORK VEHICLES

This application claims the benefit of U.S. Provisional Application No. 60/276,820, filed Mar. 16, 2001.

FIELD OF THE INVENTION

The present invention relates generally to monitoring systems for work vehicles. More particularly, the present invention relates to a monitoring system having an operator interactive system for inputting information for subsequent communication with a remote data center.

BACKGROUND OF THE INVENTION

Vehicle data recording systems have been shown to be useful in a variety of applications for logging and communicating both operator and vehicle information to a centralized database. For example, vehicle data recording systems have been used to track operator driving times, trip times, and stopping times. Further, vehicle data recording systems have been used to record fuel efficiency on a trip by trip basis, engine parameters such as temperature, and other related vehicle information. The vehicle operating information may alternatively be used in a business delivery system to optimize parameters such as driver efficiency and performance and for tracking of deliveries made by a fleet of vehicles to various destinations.

Known vehicle data recording systems do not allow the vehicle operator to provide information about the vehicle condition to the data recording system. Therefore, this important operator information can not be communicated in a compressed form to a central data center and shared with support functions, such as a technical support group or maintenance service center. Further, known systems fail to enable a technical support group or maintenance service organization to analyze or diagnose a potential maintenance problem that might be apparent from these operator inputs. Without operator information, maintenance information or replacement parts may not be provided in an efficient manner. Furthermore, the known systems do not provide an effective means of sharing data center information from a remote location.

Accordingly, there is a need for an operator interactive apparatus and method for monitoring work vehicles that provides simplified input from a vehicle operator to a mobile communication device for communicating with a central data center. Further, there is a need for an operator interactive apparatus and method for monitoring work vehicles such that the operator information is communicated to a technical support group or maintenance service function. The technical support group or maintenance organization is then able to send repair parts or maintenance information directly to the operator or fleet manager. Further still, there is a need for an operator interactive apparatus and method for monitoring work vehicles that allows an operator or a fleet manager to access diagnostic and technical service information directly from a remote location.

SUMMARY OF THE INVENTION

The present invention relates to a monitoring system for a work vehicle. The management system includes a diagnostic system configured to receive sensor information from at least one sensor mounted on the vehicle. A vehicle operator interface is configured to receive input from a vehicle operator and to display a plurality of prompts according to a predetermined algorithm. A wireless communication device is provided on board the vehicle, the wireless communication device being coupled to the diagnostic system to communicate sensor information from the diagnostic system and coupled to the vehicle operator interface to receive input from the vehicle operator interface. The management system also includes a remote central data center in wireless communication with the wireless communication device and receiving sensor information and input from the vehicle operator interface. Further, the management system includes a communications network coupled to the central data center.

In one embodiment, an off-highway work vehicle includes a diagnostic system configured to receive input from sensors mounted on the off-highway work vehicle and communicate sensor information. The off-highway work vehicle also includes an operator interface configured to receive input from an operator. Further, the off-highway work vehicle includes a wireless communication device for communicating information from the diagnostic system and from the operator interface to a data receiver.

Another exemplary embodiment relates to a method for maintaining a work vehicle. The method includes retrieving inputs from an operator and retrieving inputs from a plurality of sensors. The method also includes running a diagnostics algorithm that is configured to provide diagnostics information based on at least some of the inputs from the operator and the inputs from the sensors. Further, the method includes communicating the diagnostics information to a data receiver via a wireless data link.

Another exemplary embodiment relates to a fleet management system including a microprocessor on a work vehicle. The fleet management system also includes an operator interface on-board the work vehicle that is configured to receive inputs from an operator. The fleet management system further includes a diagnostics algorithm configured to provide diagnostics information based on the inputs received from the operator and a wireless data link configured to communicate the diagnostics information to a data receiver.

Further, the present invention relates to a vehicle having a diagnostic tool such as a portable microprocessor system. An operator interface is coupled to the microprocessor system and configured to receive input from an operator and configured to display a plurality of operator prompts according to a predetermined algorithm. Further, a wireless communication device is coupled to the microprocessor system to communicate information from the microprocessor system and from the operator interface to a data receiver.

BRIEF DESCRIPTION OF THE DRAWINGS

The invention will be more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
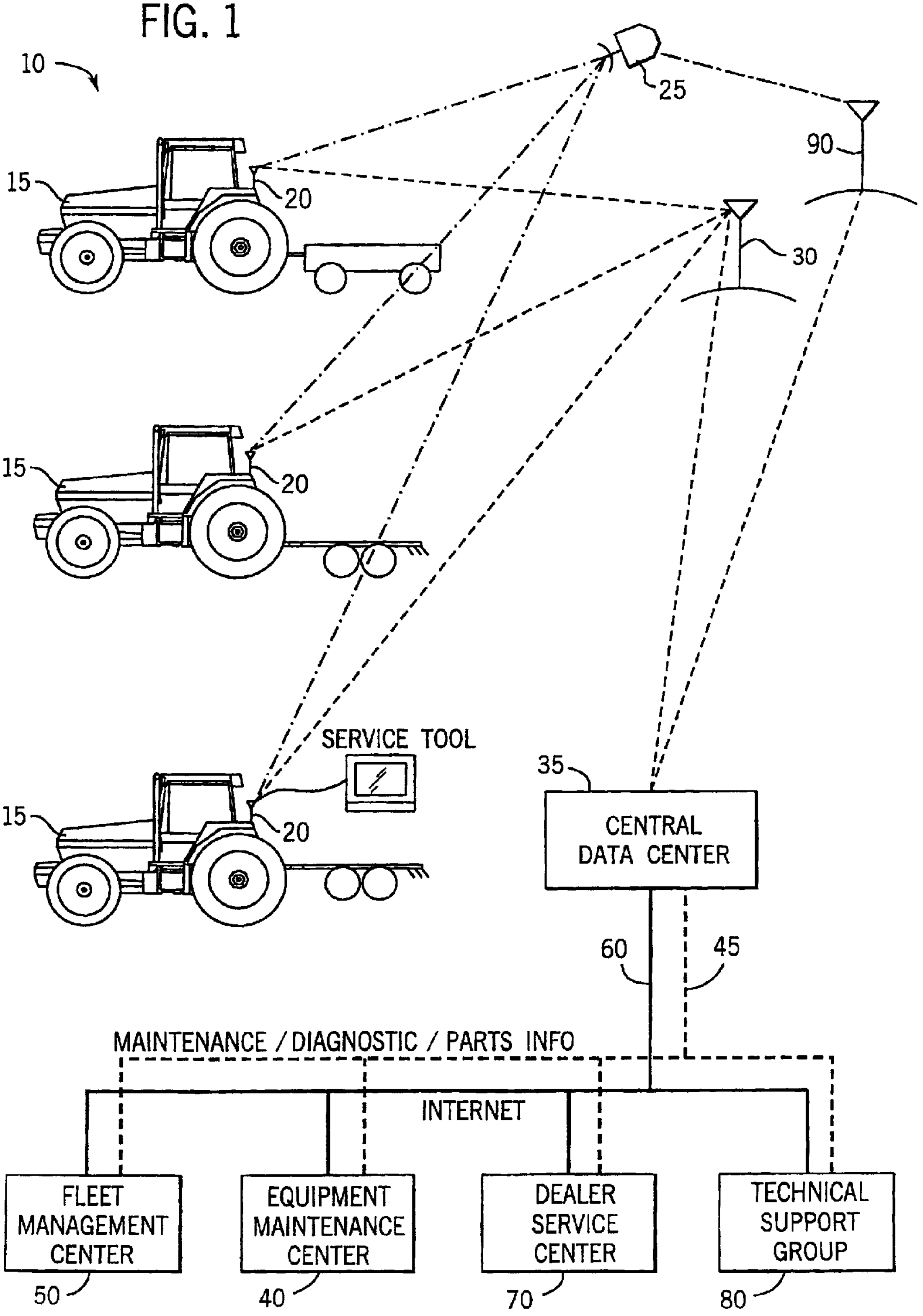
FIG. 1 is an illustration of an embodiment of a fleet management system using wireless communications.

Referring to FIG. 1, there is depicted a fleet management system 10 for the management of a plurality of off-highway work vehicles 15. The work vehicles 15 may be an agricultural tractor, as shown, or a construction-type vehicle. Each work vehicle 15 includes at least one communication antenna 20 for transmitting and receiving wireless communication signals from a low earth orbit (LEO) satellite 25 or a ground relay antenna 30 such as an RF or cellular receiving antenna. The fleet management system 10 further includes a central data center 35 at a remote site for sending and receiving information to and from either the satellite ground earth station (GES) 90 or the cellular relay tower 30. The central data center 35 may communicate 45 the vehicle or maintenance information to multiple users, including a fleet management center 50, an owner equipment maintenance center 40, a dealer service center 70, and a manufacturer's technical support group 80. These multiple users may be interconnected with the central data center 35 and each other by a computer network link, such as an internet link 60.

In the illustrated embodiment, the work vehicle 15 is an agricultural tractor. Alternatively, the work vehicle 15 may be any of a variety of vehicles, including on-road work vehicles, as well as other off-road vehicles including agricultural vehicles and construction vehicles, such as backhoes, wheel-loaders, skid steers and the like. Further still, the work vehicle 15 may include tracked vehicles, such as tracked agricultural or construction vehicles, including crawlers and dozers.

During the operation of a fleet of work vehicle, each work vehicle 15 generates information relevant to fleet management and transmits that information to the remote central data center 35 through satellite link 25 or cellular link 30. According to the present invention, the fleet management information includes information gathered from a vehicle operator on board the vehicle 15. The fleet management information also includes information gathered from a combination of sensors on board vehicle 15. Sensor information may include hour meter data, draft force, force sensor, slip control, ground speed, engine temperature, oil pressure, hydraulic pressure, or other types of information that can be communicated by electronic sensing equipment.

Figure 4:
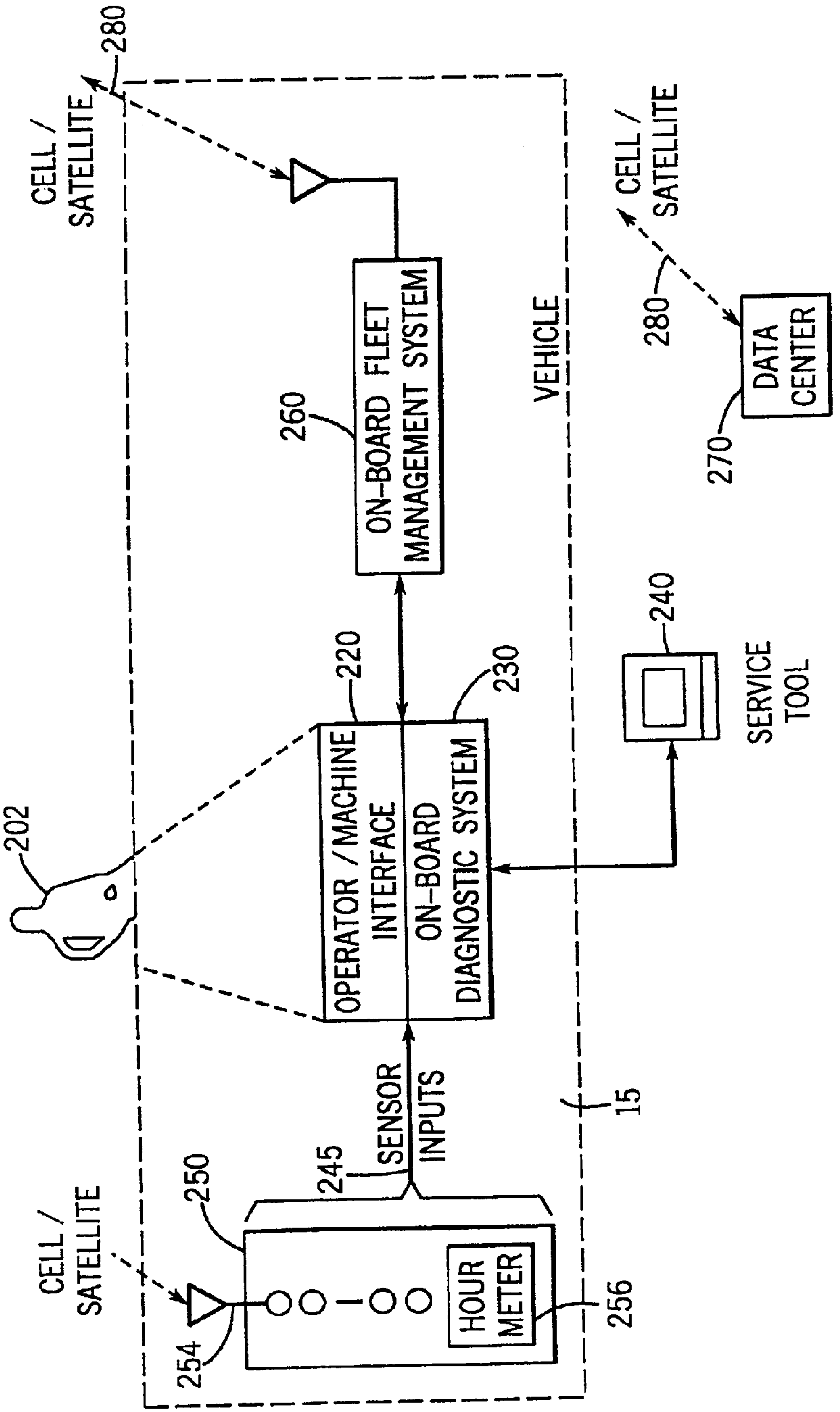
FIG. 4 is a block diagram of a preferred operator interactive apparatus for monitoring work vehicles according to the present invention.

Referring now to FIG. 4, in a preferred embodiment of the present invention, the vehicle operator 202 acts as a diagnostic sensor allowing the operator 202 to provide diagnostic information when a problem occurs with the vehicle or when the operator 202 sense a potential problem. Often, operator 202 will become aware or sense something is wrong with a vehicle, but the details of what operator 202 senses (i.e. sees, feels, hears or smells) is not reported even though it may be valuable in early detection or diagnostic isolation of problems. An intelligent or interactive vehicle instrument cluster, such as one having a microprocessor providing an operator and machine interface 220, acts as the information input mechanism for the vehicle operator. An onboard diagnostic system 230 may be coupled to the operator and machine interface 220. A plurality of vehicle sensors 250 provides data inputs 245 to the operator interface 220 and diagnostic system 230. Sensors 250 may include for example a GPS receiver 254 and an hour meter 256.

The vehicle sensors 250 may transmit information via a communication bus or alternatively through hard wired connections. Interface 220 and diagnostic system 230 may be coupled to an on-board fleet management system 260. On-board fleet management system 260 may provide either near real-time or scheduled feedback of diagnostic information to a remote data center 270 by a wireless connection 280 (such as cellular or satellite transmission). The on-board fleet management system 260 may also trigger intelligent maintenance support systems (either human or machine intelligence or both) to direct further, situation specific, onboard information gathering, either from vehicle sensors 250 or from the vehicle operator 202. In an alternative embodiment, diagnostic system 220 may store diagnostic information for later download by a service tool 240, such as to a portable computer.

Referring to FIG. 1, a remote central data center 35 receives fleet management information by wireless communication such as over a link 30 or 90. The central data center 35 may analyze the fleet management information and make the information available to other connected services. For example, a technical support group 80 can further analyze the fleet management information data to determine if any replacement parts are needed for the vehicle. Also maintenance information can be determined and immediately delivered, or relayed to a fleet management center 50. Since the fleet management center 50 is connected to central data center 35 by a communication link such as a computer internet link 60, the internet link through the data center may be used to access other information. For example, a database of previous fleet management information or other vehicle information may be accessed.

Figure 2:
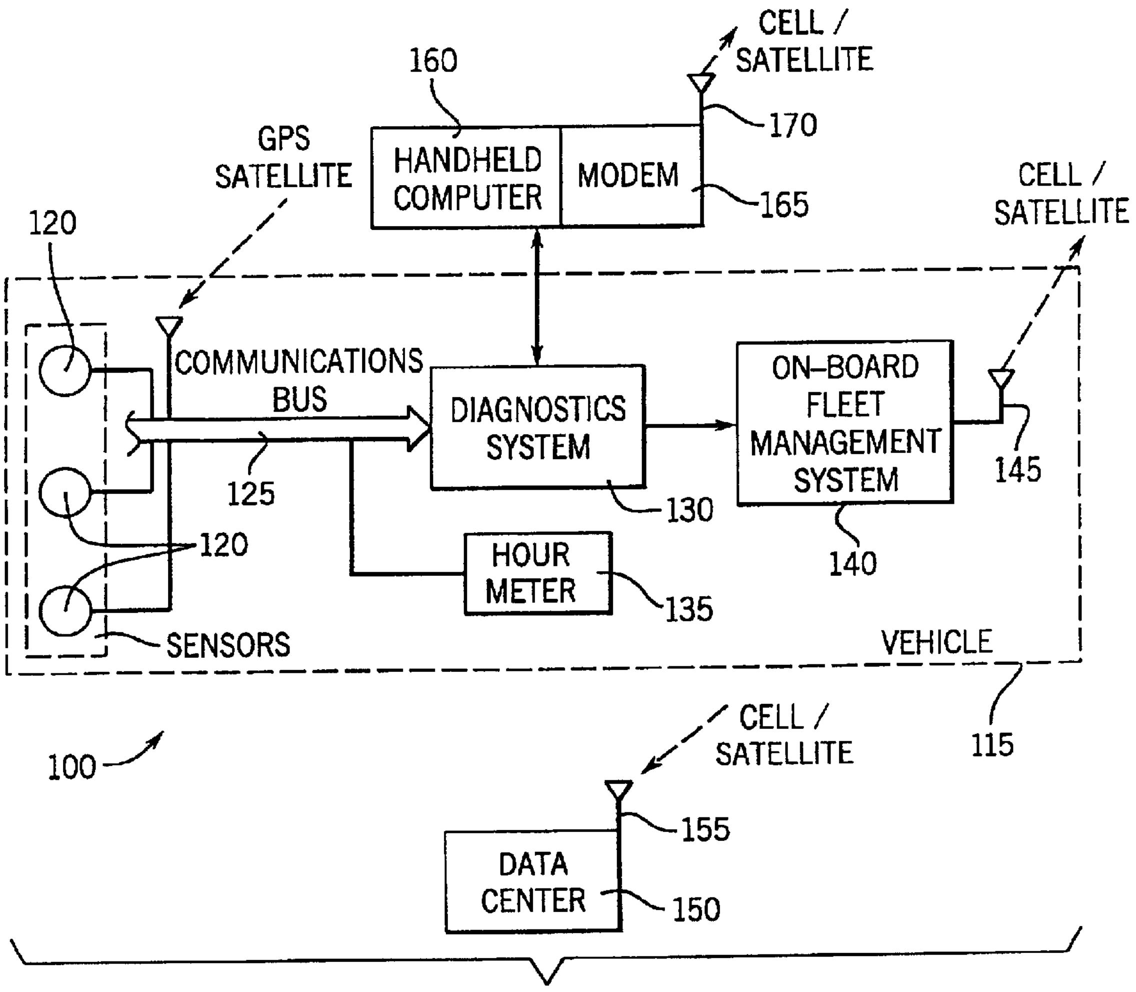
FIG. 2 is a block diagram of an operator interactive apparatus for monitoring work vehicles according to the present invention.

Referring now to FIG. 2, there is shown a block diagram of another embodiment of an operator interactive apparatus 100 for a fleet management system. Operator interactive apparatus 100 includes a vehicle 115 having a plurality of vehicle sensors 120. Sensors 120 are coupled to a communication bus 125 (such as a Controller Area Network (CAN) bus or other communication bus.) The communication bus 125 provides sensor information to a diagnostic system 130. Diagnostic system 130 gathers and interprets information from communication bus 125, such as data from vehicle sensor 120 and engine hours from meter 135. The diagnostic system 130 can store information over a predetermined time period, such as a plurality of days or weeks. Diagnostic system 130 may then communicate the fleet management information to an on-board fleet management system 140 at the predetermined interval or according to a predetermined event. On-board fleet management system 140 initiates a wireless communication such as a cellular or satellite telephone call. Alternatively, the information may be communicated over an RF channel. The diagnostics system 130 and on-board fleet management system 140 may also be incorporated into an integrated system.

A Global Positioning System (GPS) receiver may be coupled to communication bus 125, as depicted, or alternatively a GPS receiver may be coupled to the diagnostic system 130 or the on-board fleet management system 140. The operator interactive apparatus 100 communicates with a remote data center 150, with further communication to a technical service group. Data center 150 has a transmit/receive antenna 155 that is configured to receive wireless communication such as a cellular or satellite call initiated from the on-board fleet management system 140.

In further embodiment of the present invention, a portable computer 160 having a modem 165 and transmit and receive antenna 170 is coupled to and communicates with diagnostic system 130. Portable computer 160 may be configured to receive sensor or other data from diagnostic system 130. Further, portable computer 160 is configured to run a decision tree algorithm to prompt and receive input from a vehicle operator. The portable computer 160 is analogous to the microprocessor integral with the operator and machine interface 220, as shown in FIG. 4.

A diagnostic algorithm runs on the microprocessor of the portable computer 160 or operator interface 220. The algorithm asks a series of yes or no questions that are presented to the vehicle operator. Each yes or no response from the operator directs the algorithm to a successive branch of a decision tree. Each branch of the decision tree has another diagnostic question associated therewith. After a series of questions have been presented to and answered by the vehicle operator, a solution to a vehicle operating problem or failure may be identified. The diagnostics questions may pertain to the performance information of vehicle 15 sensed by the operator. Further, the diagnostics questions may pertain to the vehicle itself or to an attached implement.

Figure 3:
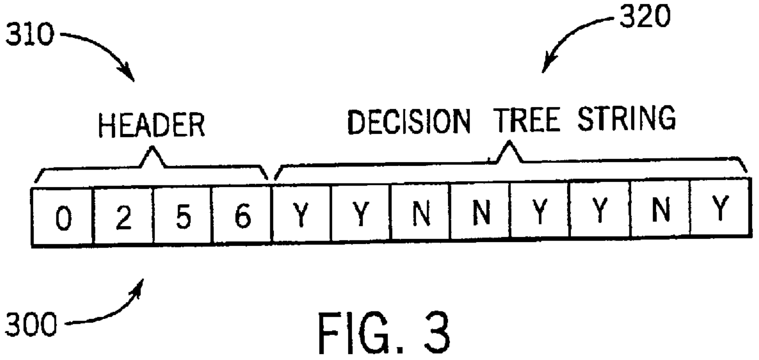
FIG. 3 is an information string representative of information communicated from the operator interactive interface to a data center.

The microprocessor records the yes or no answers to the decision tree questions in a data character string, such as character string 300 depicted in FIG. 3. The data character string 300 has a header 310 that preferably includes a vehicle identification number, such as the identification number "0256" illustrated as an example in FIG. 3. The vehicle identification number may also indicate a variety of vehicle information including vehicle type, implement attachments, or vehicle load, for example. Data character string 300 further includes a decision tree string 320. The decision tree string includes an ordered set of yes or no responses generated by the decision tree algorithm. The yes or no responses are ordered in the same order in which they were generated by the decision tree algorithm. Alternatively, the yes or no responses can be encoded in any applicable manner in the decision tree string, for example the yes or no responses may be encoded as a string of ones (1's) and zeros (0's). Further, other responses to operator questions may be applied, such as a list of multiple choice responses, a choice of yes/no/maybe, or any other system of responses to operator questions or prompts.

Character string 300 is communicated by wireless communication via modem 165 coupled to portable computer 160. The character string is ultimately received at a remote data center 150. Data center 150 may further communicate with a service group such as technical service group 80 depicted in FIG. 1. Technical service group 80 may diagnose any maintenance or failure problems with vehicle 115 by analyzing the information stored in data character string 300. For example, an operator's responses to the decision tree questions may be traced, to aid in troubleshooting, by technical support group 80. Alternatively, the technical support group 80 may be an automated response system requiring little or no human interaction. If the technical support group 80 diagnoses a problem that may be solved by installation of a new part, a request 45 for a part may be dispatched immediately to fleet management center 50. Alternatively if maintenance information 45 is required, it may be communicated to fleet management center 50. If maintenance information is required, it may be communicated directly to vehicle 115 by a broadcast over cellular or satellite data link to portable computer 160 via modem 165. Further, maintenance information 45 may be communicated directly to a service provider 70 who then can contact the fleet center 50 or the operator of vehicle 115.

It should be noted that fleet manager center 50, equipment maintenance center 40, dealer service center 70, technical support group 80 and central data center 35 may all include an interface to a communication network, depicted as internet 60. Such an interface may be a personal computer, computer server, computer workstation, dedicated communication device, and the like.

While the drawings and specific examples given describe exemplary embodiments of the present invention, they serve the purpose of illustration only. For example, the specific configuration of the diagnostic system and communication arrangement may differ depending on the work vehicle or platform or the mode of communication being used. The apparatus of the invention is not limited to the precise details and conditions disclosed. For example, the fleet management information transmitted may comprise any combination of sensor information and information received from the operator. Also, the algorithm used to generate responses from the operator is not limited to a decision tree algorithm, and other applicable response algorithms may be used. Furthermore, other substitutions, modifications, changes, and omissions may be made in the design, operating conditions, and arrangement of the preferred embodiments without departing from the spirit of the invention as expressed in the appended claims.

What is claimed is:

1. A monitoring system for a vehicle, comprising:

a diagnostic system configured to receive sensor information from at least one sensor mounted on the vehicle;

a vehicle operator interface configured to receive input from a vehicle operator and to display a plurality of prompts to the vehicle operator according to a predetermined algorithm;

a wireless communication device on board the vehicle, the wireless communication device coupled to the diagnostic system to communicate said sensor information from the diagnostic system and coupled to the vehicle operator interface to communicate said input from the vehicle operator interface;

a remote central data center in wireless communication with the wireless communication device and receiving said sensor information and said input from the vehicle operator interface; and a communications network coupled to the remote central data center, wherein the input from the vehicle operator interface is responsive to at least one computer-generated question generated according to a predetermined decision tree algorithm.

2. The monitoring system of claim 1, further comprising:

a technical support group interface coupled to the communications network.

3. The monitoring system of claim 1, further comprising:

a fleet management information center interface coupled to the communications network.

4. The monitoring system of claim 1, further comprising:

an equipment maintenance center interface coupled to the communications network.

5. The monitoring system of claim 1, further comprising:

a dealer service center interface coupled to the communications network.

6. The monitoring system of claim 1 wherein the diagnostic system is configured to store diagnostic information for download to a portable computer service tool.

7. The monitoring system of claim 1 wherein the remote data center is configured to communicate said sensor information via the Internet.

8. The monitoring system of claim 6 wherein the service tool includes a modem, and the service tool is configured to communicate via cellular telephone signal.

9. The monitoring system of claim 1 wherein the remote central data center is configured to communicate via cellular telephone signal.

10. An off-highway work vehicle comprising:

a diagnostic system configured to receive sensor information from at least one vehicle sensor mounted on the off-highway work vehicle;

an operator interface configured to receive input from a vehicle operator and to display a plurality of prompts to the vehicle operator according to a predetermined algorithm;

an onboard fleet management system coupled to the diagnostic system to receive said sensor information from the diagnostic system and coupled to the operator interface to receive said input from the operator interface; and a wireless communication device coupled to the onboard fleet management system to communicate said sensor information and said operator input from the operator interface to a data receiver;

and wherein said operator input is responsive to at least one computer-generated question according to a predetermined decision tree algorithm.

11. The off-highway work vehicle of claim 10 wherein the onboard fleet management system further comprises:

a microprocessor configured to receive said sensor information from the diagnostic system and said operator input from the operator interface.

12. The off-highway work vehicle of claim 10 wherein the transmitter is configured to transmit a satellite communications signal.

13. The off-highway work vehicle of claim 10 wherein the operator prompts are a succession of questions for the operator and wherein the operator interface is configured to accept responses to the operator prompts.

14. The off-highway work vehicle of claim 13 wherein the predetermined algorithm is a decision tree and wherein the responses are stored as a data character string.

15. The off-highway work vehicle of claim 10 wherein the data receiver is a remote central data center.

16. A method for monitoring a work vehicle comprising:

retrieving inputs from an operator on the vehicle;

retrieving sensor information from at least one sensor connected to the vehicle;

running a diagnostics algorithm configured to provide diagnostics information based on at least some of the inputs from the operator and the sensor information; and communicating the diagnostics information to a data receiver via a wireless communication data link, wherein the at least some of the inputs are provided in response to at least one computer-generated question, the question generated according to a predetermined decision tree algorithm, and wherein the data receiver is a remote data center.

17. The method of claim 16 wherein the diagnostics information is the decision tree data.

18. The method of monitoring a work vehicle of claim 16 wherein the step of communicating occurs as scheduled feedback.

19. A fleet management system for a work vehicle comprising:

a microprocessor on the work vehicle;

an operator interface on-board the work vehicle coupled to the microprocessor and configured to receive inputs from a vehicle operator;

a diagnostics algorithm configured to provide diagnostics information based on the inputs received from the operator; and a wireless data link configured to communicate the diagnostics information to a remote data receiver, wherein the operator inputs are responsive to at least one computer-generated question, the question generated according to a predetermined decision tree algorithm.

20. The fleet management system of claim 19 further comprising:

at least one vehicle sensor coupled to the vehicle and configured to supply sensor information to the diagnostics algorithm.

21. The fleet management system of claim 19 wherein the wireless communication device data link further comprises:

a modem coupled to the microprocessor and a transmitter coupled to the modem.

22. The fleet management system of claim 20 wherein the sensor is selected from the group consisting of a GPS receiver, an hour meter, a draft force sensor, and a slip control sensor.

23. A fleet management system for a work vehicle comprising:

a microprocessor on the work vehicle;

an operator interface on-board the work vehicle coupled to the microprocessor and configured to receive inputs from a vehicle operator;

a diagnostics algorithm configured to provide diagnostics information based on the inputs received from the operator; and a wireless data link configured to communicate the diagnostics information to a remote data receiver, wherein the operator inputs are responsive to at least one computer-generated question, the question generated according to a predetermined decision tree algorithm, wherein the operator interface is configured to display a plurality of operator questions, and wherein the operator interface is configured to accept responses to the operator questions.

24. The fleet management system of claim 23 wherein the responses are stored as a data character string.

* * * * *